(12) United States Patent
Hsin et al.

(10) Patent No.: US 6,580,579 B1
(45) Date of Patent: Jun. 17, 2003

(54) DISTURBANCE REJECTION FOR DISC DRIVES USING ADAPTIVE ACCELEROMETER FEEDFORWARD SERVO

(75) Inventors: Yi-Ping Hsin, Burnsville, MN (US); John C. Morris, Minneapolis, MN (US); Dustin M. Cvancara, St. Paul, MN (US)

(73) Assignee: Seagate Technology LLC, Scotts Valley, CA (US)

(*) Notice: Subject to any disclaimer, the term of this patent is extended or adjusted under 35 U.S.C. 154(b) by 239 days.

(21) Appl. No.: 09/621,163

(22) Filed: Jul. 21, 2000

Related U.S. Application Data
(60) Provisional application No. 60/145,503, filed on Jul. 23, 1999.

(51) Int. Cl.[7] ............................................. G11B 5/596
(52) U.S. Cl. ............................. 360/77.02; 360/78.04; 360/78.09
(58) Field of Search ....................... 360/75, 77.02, 360/77.03, 77.08, 77.11, 77.04, 78.04, 78.07, 78.09, 78.14

(56) References Cited

U.S. PATENT DOCUMENTS

| 4,040,103 | A |   | 8/1977  | White ........................ 360/75 |
| 4,862,298 | A |   | 8/1989  | Genheimer et al. ........... 360/60 |
| 5,235,472 | A |   | 8/1993  | Smith ........................ 360/60 |
| 5,299,075 | A |   | 3/1994  | Hanks ..................... 360/77.02 |
| 5,373,213 | A |   | 12/1994 | Smith ....................... 310/355 |
| 5,426,545 | A |   | 6/1995  | Sidman et al. ........... 360/78.09 |
| 5,521,772 | A |   | 5/1996  | Lee et al. .................... 360/75 |
| 5,663,847 | A | * | 9/1997  | Abramovitch ........... 370/77.02 |
| 6,064,540 | A | * | 5/2000  | Huang et al. ................ 360/75 |
| 6,101,453 | A | * | 8/2000  | Suga et al. ................... 702/56 |
| 6,407,876 | B1| * | 6/2002  | Yamaguchi et al. .......... 360/75 |
| 6,414,813 | B2| * | 7/2002  | Cvancara ................ 360/77.02 |
| 2001/0036026 | A1 | * | 11/2001 | Chen et al. .................... 360/31 |
| 2002/0063989 | A1 | * | 5/2002  | White et al. ............. 360/77.03 |

FOREIGN PATENT DOCUMENTS

| EP | 0 594 522 A1 | 4/1994 |
| EP | 0 735 522 B1 | 10/1996 |

OTHER PUBLICATIONS

"Adaptive Accelerometer Feedforward Servo for Disc Drives" by Satinderpall Pannu et al., presented IEEE conference, 1997.
"Rejection Rotational Disturbances on Small Disc Drives Using Rotational Accelerometers" by Daniel Y. Abramovitch; *IFAC World Congress in San Francisco, CA*; Jul. 1996.

* cited by examiner

Primary Examiner—Andrew L. Sniezek
(74) Attorney, Agent, or Firm—Joseph R. Kelly; Westman, Champlin & Kelly, P.A.

(57) ABSTRACT

A system and method for attenuating the effect of rotational vibration on the positioning of the read/write head in a disc drive. The rotational acceleration of the disc drive body is sensed and applied to an adaptive filter that produces a feedforward signal designed to offset the effects of the rotational vibration. The adaptive filter adjusts its parameters based on the rotational acceleration signal, the position error signal of the servo system, and a transfer function relating the actual position signal to the feedforward signal. The plant estimate of the transfer function relating the actual position signal to the feedforward signal is determined off-line and stored for use by the adaptive filter in adjusting its parameters during operation.

19 Claims, 4 Drawing Sheets

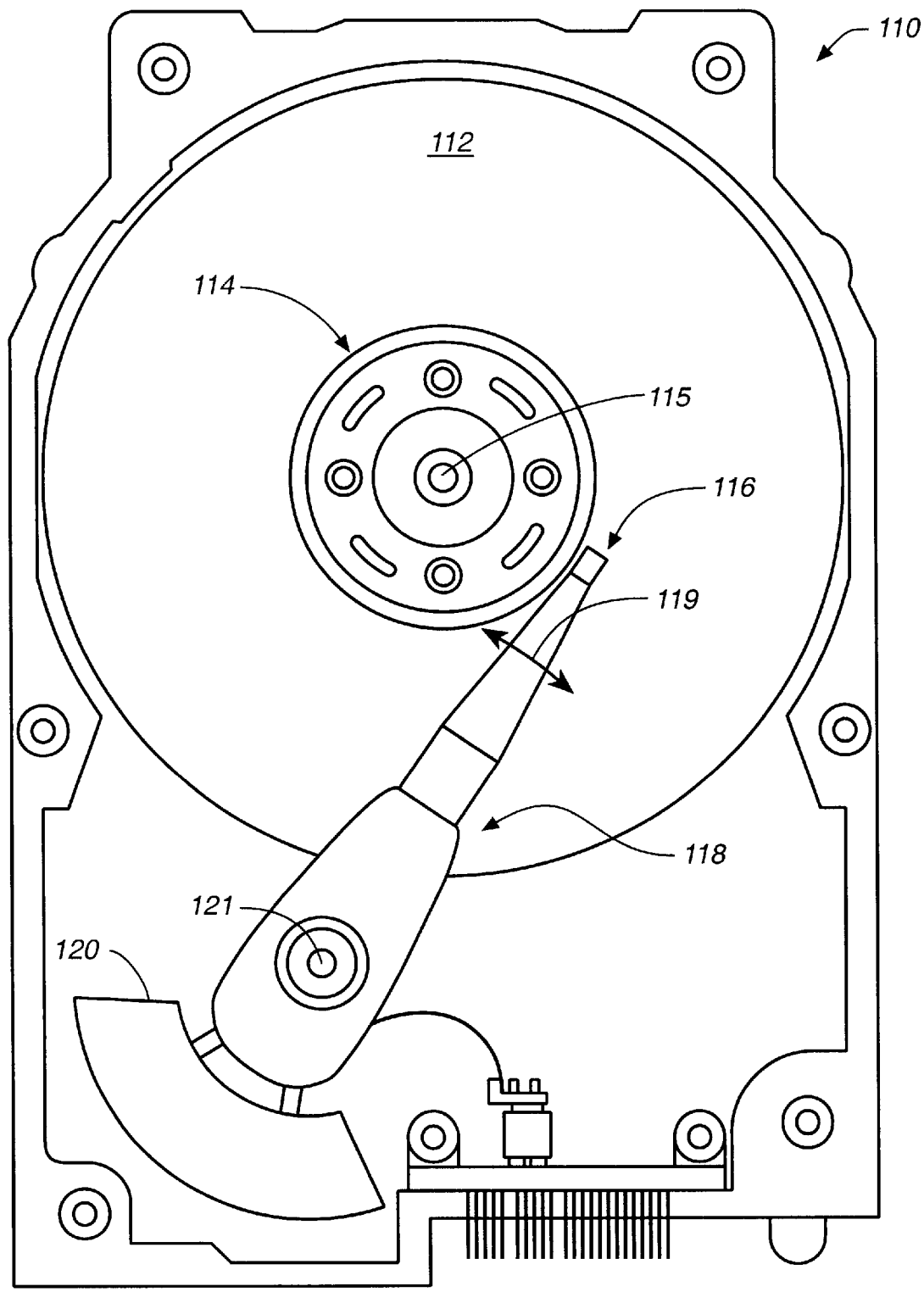
FIG._1

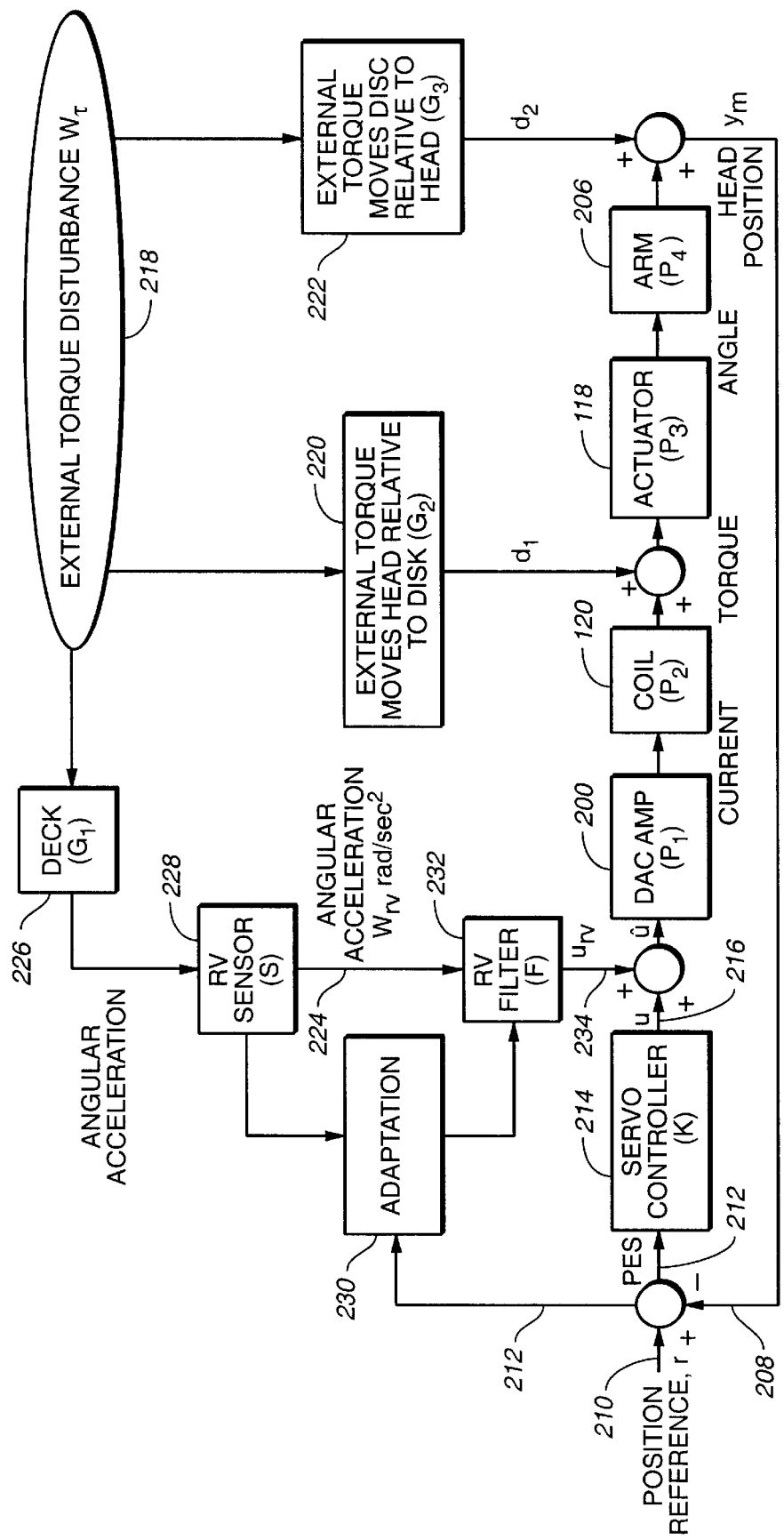
FIG._2

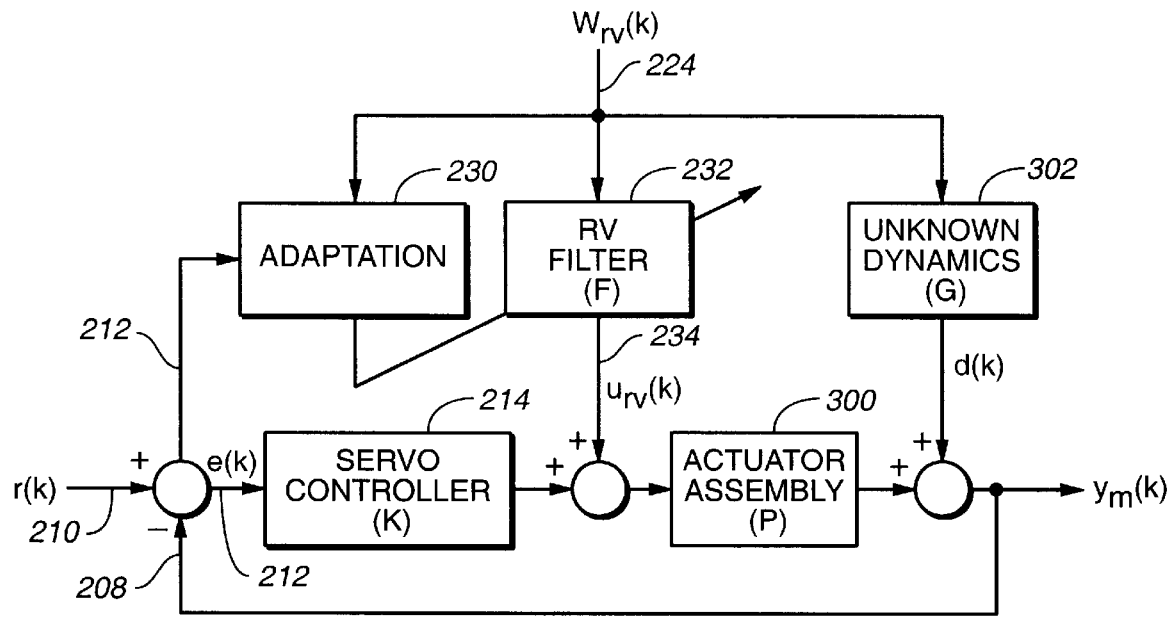
FIG._3
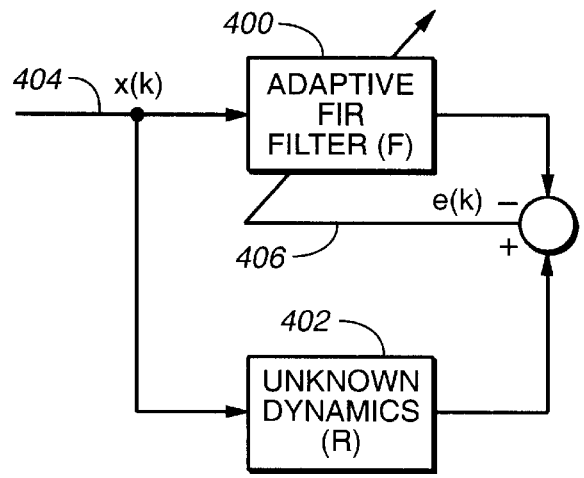
FIG._4

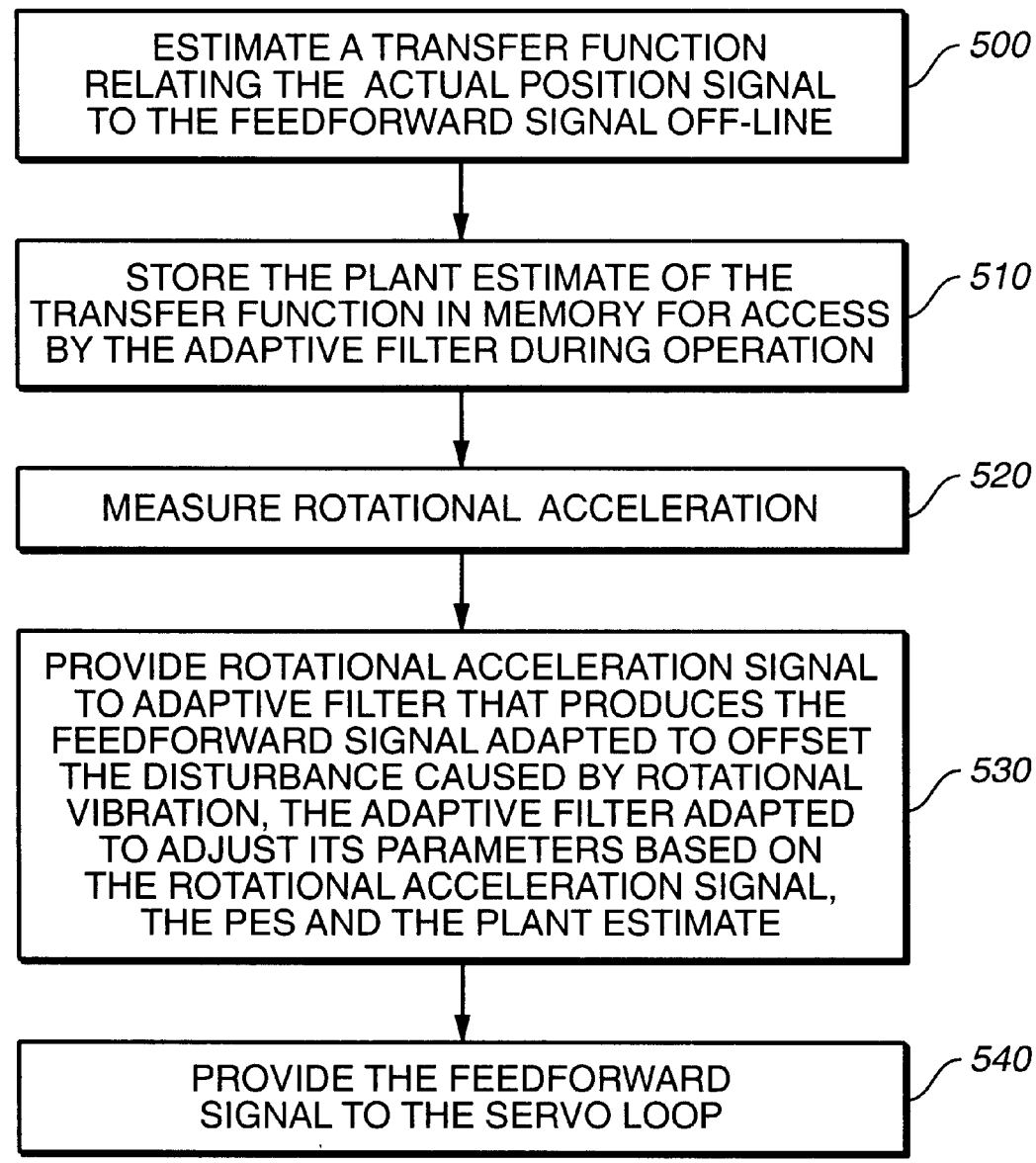
FIG._5

DISTURBANCE REJECTION FOR DISC DRIVES USING ADAPTIVE ACCELEROMETER FEEDFORWARD SERVO

CROSS-REFERENCE TO RELATED APPLICATION

This application claims the benefit of U.S. Provisional Patent Application No. 60/145,503, entitled "ENHANCED DISTURBANCE REJECTION FOR DISK DRIVES BY USING ADAPTIVE ACCELEROMETER FEEDFORWARD SERVO," filed on Jul. 23, 1999.

FIELD OF THE INVENTION

The present invention relates generally to disc drive data storage systems. More particularly, the present invention relates to attenuating the effect of rotational vibration on the positioning of a read/write head relative to a disc surface.

BACKGROUND OF THE INVENTION

Disc drives read and write information along concentric tracks formed on discs. To locate a particular track on a disc, disc drives typically use embedded servo fields on the disc. These embedded fields are utilized by a servo subsystem to position a head over a particular track. The servo fields are written onto the disc when the disc drive is manufactured and are thereafter simply read by the disc drive to determine position. A servo system samples the position of the read/write head relative to a particular track at a particular sampling rate and adjusts the position of the head.

In a typical servo system, the actual position of the read/write head relative to a given track is sensed and compared to the desired position of the head. A position error signal (PES) indicative of the difference between the actual and desired positions is provided to a servo controller. Based on the value of the position error signal, the servo controller provides a servo control signal to a power amplifier that amplifies the servo control signal and provides it to a voice coil motor. The voice coil motor is coupled to an actuator that moves in response to the application of the amplified control signal to the voice coil motor. An actuator arm that holds the read/write head is coupled to the actuator. In this way, the servo controller controls the positioning of the read/write head relative to a particular track on the disc surface.

As the areal density of magnetic disc drives increases, so does the need for more precise position control when track following, especially in the presence of external vibrations. In order to desensitize the disc drive to translational vibrations, a balanced mechanical actuator has been typically used. However, since the actuator must pivot freely to access the data, the effects of rotational vibration about the axis parallel to the pivot axis can be considerable. Such rotational vibrations are commonly caused by vibrational energy produced by another voice coil motor/actuator assembly in the same drive when said other actuator assembly is seeking from one track to another. Such rotational vibrations can cause non-repeatable runout (NRRO) of the position error.

A number of researchers have investigated the feasibility of using accelerometers for disturbance rejection. Hanks proposed using accelerometers mounted to the disc-drive assembly to attenuate disturbances. (U.S. Pat. No. 5,299,075). A single constant gain, which was determined off-line, was used to feed the accelerometer signal to the voice coil motor. Abramovitch used the least-mean-square (LMS) adaptation algorithm to estimate the value of the single gain. No plant estimation of the disc drive was attempted. Abramovitch, Daniel Y., "Rejecting Rotational Disturbances on Small Disk Drives Using Rotational Accelerometers," Control Engineering Practice, vol. 5, no. 11, November 1997, p 1517–1524. Kempf used an accelerometer on a compact disc player to control the focus length of the reading lens. The filtered-x LMS adaptation algorithm was applied to the controller parameters. Kempf, C. J., Design of Servo Systems for Disturbance Rejection and Applications to Disk File Storage Systems, Ph.D. thesis, University of California at Berkeley, 1994.

The present invention provides a solution to these and other problems and offers other advantages over the prior art.

SUMMARY OF THE INVENTION

The present invention serves to attenuate the effect of rotational vibration on the positioning of a read/write head relative to a disc surface.

One embodiment of the present invention is directed a method of attenuating the effect of rotational vibration on the positioning of the read/write head. Pursuant to the method, the rotational acceleration of the disc drive body is measured. A rotational acceleration signal indicative of the measured rotational acceleration is provided to an adaptive filter. The adaptive filter is adapted to further receive the position error signal and to produce a feedforward signal calculated to offset the disturbance to the read/write head position caused by rotational vibration. The adaptive filter further adjusts its parameters based upon the rotational acceleration signal, the position error signal and a transfer function relating an actual position signal, indicative of the actual position of the read/write head relative to the disc surface, to the feedforward signal. The feedforward signal is provided to the servo loop. The transfer function relating the actual position signal to the feedforward signal is estimated off-line and stored in memory for access by the adaptive filter during operation.

Another embodiment of the present invention is directed to a disc drive servo system that includes an actuator assembly, a servo controller, a rotational acceleration sensor, an adaptive filter and a computer storage medium. The actuator assembly positions a read/write head relative to a disc surface. The servo controller receives a position error signal indicative of a difference between an actual position of the read/write head relative to the disc surface and a desired position of the read/write head. The servo controller then provides a servo control signal to the actuator assembly based on the value of the position error signal. The rotational acceleration sensor measures the rotational acceleration of the disc drive body and produces a rotational acceleration signal indicative of the measured rotational acceleration. The adaptive filter receives the rotational acceleration signal and the position error signal and provides a feedforward signal to the actuator assembly. The feedforward signal is adapted to offset the disturbance to the read/write head position caused by rotational vibration. The adaptive filter adjusts its parameters based upon the rotational acceleration signal, the position error signal and a transfer function relating an actual position signal, indicative of the actual position of the read/write head relative to the disc surface, to the feedforward signal. The computer storage medium holds a predetermined plant estimate of the transfer function relating the actual position signal to the feedforward, the plant estimate being determined off-line.

These and various other features as well as advantages which characterize the present invention will be apparent upon reading of the following detailed description and review of the associated drawings.

BRIEF DESCRIPTION OF THE DRAWINGS

FIG. 1 is a plan view of a disc drive suitable for use with the present invention.

FIG. 2 is a block diagram of a disc drive servomechanism with an adaptive controller according to an illustrative embodiment of the present invention.

FIG. 3 is a simplified block diagram of a servo system with an adaptive feedforward control scheme according to an illustrative embodiment of the present invention.

FIG. 4 is a block diagram of the typical LMS adaptive filter scheme.

FIG. 5 is a flow chart representing a method of attenuating the effect of rotational vibration on the positioning of a read/write head according to an illustrative embodiment of the present invention.

DETAILED DESCRIPTION OF ILLUSTRATIVE EMBODIMENTS

FIG. 1 is a plan view of a typical disc drive 110. Disc drive 110 includes a disc pack 112, which is mounted on a spindle motor (not shown) by a disc clamp 114. Disc pack 112, in one preferred embodiment, includes a plurality of individual discs which are mounted for co-rotation about a central axis 115. Each disc surface on which data is stored has an associated head-gimbal assembly (HGA) 116 which is mounted to an actuator 118 in disc drive 110. The actuator assembly shown in FIG. 1 is of the type known as a rotary moving coil actuator and includes a voice coil motor shown generally at 120. Voice coil motor 120 rotates actuator 118 with its attached head-gimbal assemblies 116 about a pivot axis 121 to position head-gimbal assemblies 116 over desired data tracks on the associated disc surfaces, under the control of electronic circuitry housed within disc drive 110.

More specifically, actuator 118 pivots about axis 121 to rotate head-gimbal assemblies 116 generally along an arc 119 which causes each head-gimbal assembly 116 to be positioned over a desired one of the tracks on the surfaces of discs in disc pack 112. Head-gimbal assemblies 116 can be moved from tracks lying on the innermost radius, to tracks lying on the outermost radius of the discs. Each head-gimbal assembly 116 has a gimbal which resiliently supports a slider relative to a load beam so that the slider can follow the topography of the disc. The slider, in turn, includes one or more transducers, which are utilized for encoding flux reversals on, and reading flux reversals from, the surface of the disc over which it is flying.

The present invention presents an adaptive feedforward control scheme that utilizes an accelerometer signal to improve the capability of external disturbance rejection in the track-following servomechanism when operating under vibrational environments. By matching the unknown disturbance dynamics with a filtered-x LMS (least mean square) adaptation algorithm, the feedforward controller is able to cancel the external disturbances. This results in a significant reduction of the non-repeatable runout induced by rotational vibration.

The present invention will be discussed with respect to a single-input, single-output (SISO) discrete time stochastic system. It will be appreciated that the invention is also applicable to other systems. All transfer functions and signals are expressed in the discrete time domain by using the sampling time index, k, and the unit delay operator $q^{-1}$.

FIG. 2 is a block diagram of a disc drive servomechanism in track-following mode with an additional adaptive controller according to an illustrative embodiment of the present invention. An actuator assembly model includes digital-to-analog converter (DAC) and power amplifier 200 ($P_1$), voice coil motor 120 ($P_2$), actuator 118 ($P_3$) and actuator arm 206 ($P_4$). The actual position $y_m$ 208 of the read/write head relative to a given track is sensed and compared to the desired position 210 (r) of the head. A position error signal (PES) 212 indicative of the difference between the actual and desired positions is provided to servo controller 214. Based on the value of position error signal 212, servo controller 214 (K) provides a servo control signal 216 to DAC/ power amplifier 200, which converts the digital servo control signal 216 to an analog signal, amplifies the signal and provides it to voice coil motor 120. Voice coil motor 120 is coupled to actuator 118 that moves in response to the application of the amplified control signal to voice coil motor 120. An actuator arm 204 that holds the read/write head is coupled to the actuator. In this way, servo controller 214 controls the positioning of the read/write head relative to a particular track on the disc surface.

The external torque disturbance $w_\tau$ 218 generates both the torque disturbance $d_1$ to actuator 118 and the disturbance $d_2$ to head position through the unknown dynamics $G_2$ 220 and $G_3$ 992 respectively. It also generates the angular acceleration signal $w_{rv}$ 224 through the deck $G_1$ 226 and the accelerometer S 228 which are also unknown. In an illustrative embodiment, accelerometer 228 is mounted on the disc drive body in order to measure acceleration signal 224 caused by rotational vibrations. Illustratively, accelerometer 228 is mounted on the base casting of the disc drive. The external vibrations can only be observed by the angular acceleration signal $w_{rv}$ 224 through the accelerometer 228. The rotational vibration measurement signal $w_{rv}$ 224 is hence correlated with the external disturbances $d_1$ and $d_2$. Adaptive FIR filter F 232 generates a feedforward signal $u_{rv}$ 234 from the rotational vibration measurement $w_{rv}$ 224 in order to cancel the external disturbances $d_1$ and $d_2$. Both the position error signal 212 and the rotational vibration measurement signal 224 are used for FIR parameter tuning in the adaptation algorithm 230. The addition of the feedforward signal $u_{rv}$ 234 and the servo control signal u 216 from the existent servo controller 214 is denoted by û, which is fed into the DAC and power amplifier 200.

FIG. 3 is a simplified block diagram of a servo system with an adaptive feedforward control scheme according to an illustrative embodiment of the present invention. The external torque disturbance $w_\tau$ 218 of FIG. 2 is substituted with the rotational vibration measurement $w_{rv}$ 224, which is used as the source of both the feedforward signal 234 and the external disturbance d(k) in FIG. 2. The actuator assembly model P 300 includes digital-to-analog converter and power amplifier 200 ($P_1$), voice coil motor 120 ($P_2$), actuator 118 ($P_3$) and actuator arm 206 ($P_4$). Actuator assembly P 300 in FIG. 3 can be expressed as $$P=P_1P_2P_3P_4 \qquad \text{Eq. (1)}$$

Unknown dynamics G 302 can be expressed as $$G = \frac{P_3 P_4 G_2 + G_3}{SG_1} \qquad \text{Eq. (2)}$$

Position error signal 212 is denoted by e(k). The disturbance term d(k) is the total effect of external vibrations to head position, which is equivalent to $$d(k) = P_3 P_4 d_1(k) + d_2(k) \qquad \text{Eq. (3)}$$

From FIG. 3, it can be seen that the auxiliary feed forward signal $u_{rv}$ (k) 234 and the external disturbance d(k) can be treated as originating with the same source input $w_{rv}$ (k) 224. Their relationships can be written as $$u_{rv}(k) = F(k, q^{-1}) w_{rv}(k) \qquad \text{Eq. (4)}$$

$$d(k) = G(k, q^{-1}) w_{rv}(k) \qquad \text{Eq. (5)}$$

From FIG. 2, for the reference input r(k)=0, the position error signal e(k) 212 can be derived as $$e(k) = \frac{1}{1+KP} d(k) - \frac{P}{1+KP} u_{rv}(k) \qquad \text{Eq. (6)}$$

Substituting equations (4) and (5) into equation (6), e(k) becomes $$e(k) = \left(-\frac{G}{1+KP} - \frac{PF}{1+KP}\right) w_{rv}(k) \qquad \text{Eq. (7)}$$

The first term at the right hand side of equation (7) is the net effect of external disturbance to the position error signal 212, and the second term is the disturbance cancellation from the adaptive feedforward scheme. The objective of the adaptive filter $F(k, q^{-1})$ in the second term is to approximate the unknown disturbance dynamics in the first term by adjusting its parameters, and to then cancel the unknown disturbance dynamics for minimum error level. The filtered-x least-mean-square (LMS) adaptive algorithm is hence applied for parameter adaptation of $F(k, q^{-1})$ and will be discussed in the following section.

In an illustrative embodiment of the present invention, the LMS adaptive filter is a tapped delay line with variable coefficients or tap weights driven by the LMS algorithm of Widrow and Hoff. This algorithm is described in *Adaptive Inverse Control*, Bernard Widrow and Eugene Wallach, Prentice Hall, Inc. 1996, which is hereby incorporated by reference. The LMS is a gradient algorithm based on the method of steepest decent. FIG. 4 is a block diagram of the typical LMS adaptive filter scheme where x(k) 404 is the input signal and e(k) 406 is the modeled error signal. The unknown dynamics 402 are denoted by $R(k, q^{-1})$. The transfer function for an N-tap adaptive FIR filter $F(k, q^{-1})$ takes the form $$F(k, q^{-1}) = f_0(k) + f_1(k) q^{-1} + \ldots + f_{N-1}(k) q^{-(N-1)} \qquad \text{Eq. (8)}$$

where the parameters $f_i(k)$, or tap weights, at time k are adjusted on-line via the LMS algorithm.

From FIG. 4, the relationship between the input signal x(k) 404 and the modeled error signal e(k) 406 is derived as $$e(k) = [R(k, q^{-1}) - F(k, q^{-1})] x(k) \qquad \text{Eq. (9)}$$

The goal of the adaptive FIR filter 400 is using both the input signal 404 and the feedback error signal 406 to adjust the tap weights in order to match the unknown dynamics R and result in minimum mean square error. The update law of tap weights is given by $$f_i(k+1) = f_i(k) + 2 \mu \cdot e(k) \cdot x(k-i); \text{ for } i = 0, 1, \ldots, N-1 \qquad \text{Eq. (10)}$$

where $\mu$ is a constant gain which determines the convergence rate and minimum error level.

For fitting the block diagram shown in FIG. 4 in order to reach the minimum error level in the adaptive accelerometer feedforward scheme of FIGS. 2 and 3, the modified scheme, filtered-x LMS adaptive algorithm, is necessary. This scheme is described generally in the Widrow and Wallach work mentioned previously, though that work does not discuss the scheme in relation to disc drives nor rotational accelerometers. From FIG. 3, the transfer function H between the actual position measurement $y_m$ (k) and the feedforward signal $u_{rv}$ (k) can be derived as $$H = \frac{P}{1+KP} = \frac{Y_m(z)}{U_{rv}(z)} \qquad \text{Eq. (11)}$$

Substituting equation (11) into equation (7), e(k) can be expressed as $$e(k) = \left(-\frac{G}{P} - G\right) H w_{rv}(k) \qquad \text{Eq. (12)}$$

Comparing equation (12) with equation (9), if the x(k) signal is defined as $$x(k) = H(k, q^{-1}) w_{rv}(k) \qquad \text{Eq. (13)}$$

and is available for the parameter update law shown in equation (10), the adaptive filter $F(k, q^{-1})$ will be capable of adjusting its tap weights to trace the unknown dynamics—G/P and minimize the position error signal 212 caused by external disturbances. According to the present invention, the transfer function of H is not calculated on-line. Rather, the plant estimation of H is performed off-line. The frequency response of plant H is measured off-line and the a priori estimate Ĥ is then made. The plant estimate Ĥ is then stored in memory and made available for access by adaptation algorithm 230 during operation of the adaptive feedforward scheme. In an illustrative embodiment, the plant estimate Ĥ used is the fourth order system, which is relatively easy for on-line implementation. The x(k) signal used in the update law of tap weights in equation (10) is then available on-line by replacing the transfer function H with the plant estimate Ĥ in equation (13) and becomes $$x(k) = \hat{H}(k, q^{-1}) w_{rv}(k) \qquad \text{Eq. (14)}$$

The position error signal e(k) in equation (12) is also modified to become $$e(k) = \left(-\frac{G}{P} - \frac{\hat{H}}{H} F\right) H w_{rv}(k) \qquad \text{Eq. (15)}$$

An alternative to determining the plant estimate Ĥ off-line would be to determine H on-line in real time by employing a second adaptive filter. However, disc drive servo systems typically have limited memory space and time to run complicated processes. Determining the transfer function H on-line in real time requires large amounts of memory space and consumes considerable amounts of precious time. The filtered-x LMS algorithm is appealing for disc drive applications because it is simple and requires few computations. This is due mainly to the fact that it uses a constant adaptation gain and has no real-time plant identification. Note that using an a priori estimate of H may seem to defeat the purpose of the adaptation. However, it has been shown experimentally that even a poor estimate of H is generally acceptable. *Adaptive Inverse Control*, Widrow and Wallach. The condition of Ĥ for convergence of the filtered-x LMS algorithm is that Ĥ/H is strictly positive real.

In experimental trials, disc drives employing the filtered-x LMS adaptive accelerometer feedforward scheme of the present invention were subjected to different rotational vibration profiles. The drives were able to provide an average improvement of 83% reduction in non-repeatable runout induced by rotational vibration.

FIG. 5 is a flow chart representing a method of attenuating the effect of rotational vibration on the positioning of a read/write head according to an illustrative embodiment of the present invention. At step 500, the transfer function H relating the actual position signal 208 to the feedforward signal 234 is estimated off-line. At step 510, the plant estimate Ĥ of the transfer function is stored in memory for access by the adaptive filter 230, 232 during operation. At step 520, the rotational acceleration of the disc drive body 110 is measured. At step 530, the rotational acceleration signal 224 indicative of the measured rotational acceleration is provided to adaptive filter 230, 232. The adaptive filter 230, 232 is adapted to further receive the position error signal 212 and to produce a feedforward signal 234 calculated to offset the disturbance to the read/write head 116 position caused by rotational vibration. The adaptive filter 230, 232 adjusts its parameters based upon the rotational acceleration signal 224, the position error signal 212 and the plant estimate Ĥ. At step 540, the feedforward signal 234 is provided to the servo loop.

In summary, one embodiment of the present invention is directed a method of attenuating the effect of rotational vibration on the positioning of the read/write head 116 in a disc drive 110. Pursuant to the method, the rotational acceleration of the disc drive body 110 is measured. A rotational acceleration signal 224 indicative of the measured rotational acceleration is provided to an adaptive filter 230, 232. The adaptive filter 230, 232 is adapted to further receive the position error signal 212 and to produce a feedforward signal 234 calculated to offset the disturbance to the read/write head 116 position caused by rotational vibration. The adaptive filter 230, 232 adjusts its parameters based upon the rotational acceleration signal 224, the position error signal 212 and a transfer function H relating an actual position signal 208, to the feedforward signal 234. The feedforward signal 234 is provided to the servo loop. The transfer function H is estimated off-line and stored in memory for access by the adaptive filter 230, 232 during operation.

Another embodiment of the present invention is directed to a disc drive servo system that includes an actuator assembly 300, a servo controller 214, a rotational acceleration sensor 228, an adaptive filter 230, 232 and a computer storage medium. The actuator assembly 300 positions a read/write head 116 relative to a disc surface 112. The servo controller 214 receives a position error signal 212 indicative of a difference between an actual position of the read/write head 116 relative to the disc surface 112 and a desired position of the read/write head 116. The servo controller 214 then provides a servo control signal 216 to the actuator assembly 300 based on the value of the position error signal 212. The rotational acceleration sensor 228 measures the rotational acceleration of the disc drive body 110 and produces a rotational acceleration signal 224 indicative of the measured rotational acceleration. The adaptive filter 230, 232 receives the rotational acceleration signal 224 and the position error signal 212 and provides a feedforward signal 234 to the actuator assembly. The feedforward signal 234 is adapted to offset the disturbance to the read/write head position caused by rotational vibration. The adaptive filter 230, 232 adjusts its parameters based upon the rotational acceleration signal 234, the position error signal 212 and a transfer function H relating an actual position signal 208, indicative of the actual position of the read/write head 116 relative to the disc surface 112, to the feedforward signal 234. The computer storage medium holds a predetermined plant estimate Ĥ of the transfer function relating the actual position signal 208 to the feedforward signal 234, the plant estimate Ĥ being determined off-line, for use by the adaptive filter 230, 232 in adjusting its parameters during operation.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the filtered-x LMS adaptive accelerometer feedforward scheme while maintaining substantially the same functionality without departing from the scope and spirit of the present invention. In addition, although the preferred embodiment described herein is directed to a filtered-x LMS adaptive accelerometer feedforward scheme for a magnetic disc drive system, it will be appreciated by those skilled in the art that the teachings of the present invention can be applied to other systems, such as optical drives, without departing from the scope and spirit of the present invention.

What is claimed is:

1. In a disc drive servo system comprising a servo loop adapted to position a read/write head relative to a disc surface based upon a position error signal indicative of a difference between an actual position of the read/write head relative to the disc surface and a desired position of the read/write, a method of attenuating an effect of rotational vibration on the positioning of the read/write head, comprising steps of:

(a) measuring a rotational acceleration of the disc drive body;

(b) providing a rotational acceleration signal indicative of the measured rotational acceleration to an adaptive filter adapted to further receive the position error signal and to produce a feedforward signal adapted to offset a disturbance to the read/write head position caused by rotational vibration, the adaptive filter having parameters that are adjustable based upon the rotational acceleration signal, the position error signal and a transfer function relating an actual position signal, indicative of the actual position of the read/write head relative to the disc surface, to the feedforward signal;

(c) providing the feedforward signal to the servo loop;

(d) estimating a transfer function relating the actual position signal to the feedforward signal off-line; and (e) storing the estimate of the transfer function in memory for access by the adaptive filter during operation.

2. The method of claim 1 wherein the adaptive filter is a tapped delay line with variable tap weights.

3. The method of claim 2 wherein the variable tap weights are driven by a least-mean-square algorithm.

4. The method of claim 3 wherein the least-mean-square algorithm is a gradient algorithm based on the method of steepest descent.

5. The method of claim 4 wherein a transfer function F of the adaptive filter is $$F(k,q^{-1}) = f_0(k) + f_1(k)q^{-1} + \ldots + f_{N-1}(k)q^{-(N-1)}$$

where $q^{-1}$ is a unit delay operator and the tap weights $f_i(k)$ at time k are adjusted on-line via the least-mean-square algorithm.

6. The method of claim 5 wherein the tap weights are updated as follows:

$$f_i(k+1) = f_i(k) + 2\mu \cdot e(k) \cdot x(k-i); \text{ for } i=0,1,\ldots,N-1$$

where e(k) is the difference between the actual disturbance caused by rotational vibration and the feedforward signal, x(k) is the input to the adaptive filter, and $\mu$ is a constant gain which determines the convergence rate and minimum error level.

7. The method of claim 6 wherein the input x(k) to the adaptive filter is $$x(k) = \hat{H}(k,q^{-1}) w_{rv}(k)$$

where $w_{rv}(k)$ is the measured rotational acceleration and $\hat{H}(k,q^{-1})$ is the estimate of the transfer function relating the actual position signal to the feedforward signal.

8. The method of claim 6 wherein $$e(k) = \left(-\frac{G}{P} - \frac{\hat{H}}{H}F\right) H w_{rv}(k)$$

where G is the unknown dynamics caused by rotational vibration, P is the dynamics of the actuator assembly, H is the transfer function relating the actual position signal to the feedforward signal, and $\hat{H}$ is the estimate of the transfer function relating the actual position signal to the feedforward signal.

9. The method of claim 1 wherein the servo loop includes a servo controller adapted to provide a servo control signal to an actuator assembly based on the value of the position error signal, the actuator assembly adapted to position the read/write head based on the value of the servo control signal and wherein providing step (c) comprises adding the feedforward signal to the servo control signal.

10. A disc drive servo system comprising:
  an actuator assembly adapted to position a read/write head relative to a disc surface;
  a rotational acceleration sensor adapted to measure the rotational acceleration of the disc drive body and to produce a rotational acceleration signal indicative of the measured rotational acceleration;
  an adaptive filter adapted to receive the rotational acceleration signal and a position error signal indicative of a difference between an actual position of the read/write head relative to the disc surface and a desired position of the read/write head and to provide a feedforward signal to the actuator assembly, the feedforward signal adapted to offset a disturbance to the read/write head position caused by rotational vibration, the adaptive filter having parameters that are adjustable based upon the rotational acceleration signal, the position error signal and a transfer function relating an actual position signal, indicative of the actual position of the read/write head relative to the disc surface, to the feedforward signal; and
  a computer storage medium adapted to hold a predetermined plant estimate of the transfer function relating the actual position signal to the feedforward signal, the plant estimate being determined off-line, for use by the adaptive filter in adjusting its parameters during operation.

11. The servo system of claim 10 further comprising a servo controller adapted to receive the position error signal and to provide a servo control signal to the actuator assembly based on the value of the position error signal and wherein the feedforward signal is added to the servo control signal.

12. The servo system of claim 10 wherein the adaptive filter is a tapped delay line with variable tap weights.

13. The servo system of claim 12 wherein the variable tap weights are driven by a least-mean-square algorithm.

14. The servo system of claim 13 wherein the least-mean-square algorithm is a gradient algorithm based on the method of steepest descent.

15. The servo system of claim 14 wherein the transfer function F of the adaptive filter is $$F(k,q^{-1}) = f_0(k) + f_1(k)q^{-1} + \ldots + f_{N-1}(k)q^{-(N-1)}$$

where $q^{-1}$ is a unit delay operator and the tap weights $f_i(k)$ at time k are adjusted on-line via the least-mean-square algorithm.

16. The servo system of claim 15 wherein the tap weights are updated as follows:

$$f_i(k+1) = f_i(k) + 2\mu \cdot e(k) \cdot x(k-i); \text{ for } i=0,1,\ldots,N-1$$

where e(k) is the difference between the actual disturbance caused by rotational vibration and the feedforward signal, x(k) is the input to the adaptive filter, and $\mu$ is a constant gain which determines the convergence rate and minimum error level.

17. The servo system of claim 16 wherein the input x(k) to the adaptive filter is $$x(k) = \hat{H}(k,q^{-1}) w_{rv}(k)$$

where $w_{rv}(k)$ is the measured rotational acceleration and $\hat{H}(k,q^{-1})$ is the estimate of the transfer function relating the actual position signal to the feedforward signal.

18. The servo system of claim 16 wherein $$e(k) = \left(-\frac{G}{P} - \frac{\hat{H}}{H}F\right) H w_{rv}(k)$$

where G is the unknown dynamics caused by rotational vibration, P is the dynamics of the actuator assembly, H is the transfer function relating the actual position signal to the feedforward signal, and $\hat{H}$ is the estimate of the transfer function relating the actual position signal to the feedforward signal.

19. The servo system of claim 10 wherein the rotational acceleration sensor is coupled to a base casting of the disc drive.

* * * * *

UNITED STATES PATENT AND TRADEMARK OFFICE
CERTIFICATE OF CORRECTION

PATENT NO.    : 6,580,579 B1
DATED         : June 17, 2003
INVENTOR(S)   : Hsin et al.

It is certified that error appears in the above-identified patent and that said Letters Patent is hereby corrected as shown below:

<u>Column 10,</u>
Line 28, delete equation "+ $f_N$ -1$(k)q^{-(N-1)}$" should be -- + $f_{N-1}(k)q^{-(N-1)}$ --

Signed and Sealed this

Eighth Day of June, 2004

JON W. DUDAS
*Acting Director of the United States Patent and Trademark Office*